(12) United States Patent
Sanada et al.

(10) Patent No.: US 6,603,725 B2
(45) Date of Patent: Aug. 5, 2003

(54) DISK CARTRIDGE APPARATUS

(75) Inventors: Yotaro Sanada, Tokyo (JP); Yoshio Kusui, Kanagawa (JP); Naohiro Netsu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/777,111

(22) Filed: Feb. 5, 2001

(65) Prior Publication Data

US 2001/0021158 A1 Sep. 13, 2001

(30) Foreign Application Priority Data

Feb. 4, 2000 (JP) .................................. 2000-028073

(51) Int. Cl.[7] .............................................. G11B 33/02
(52) U.S. Cl. ......................................................... 369/77.2
(58) Field of Search ........................................... 369/77.2

(56) References Cited

U.S. PATENT DOCUMENTS

| | | | | |
|---|---|---|---|---|
| 5,923,630 A | * | 7/1999 | Yoshida et al. | 369/289 |
| 6,144,629 A | * | 11/2000 | Kurita et al. | 360/99.06 |
| 6,292,452 B1 | * | 9/2001 | Endo et al. | 369/75.2 |
| 6,301,215 B1 | * | 10/2001 | Otsuki et al. | 360/99.02 |

FOREIGN PATENT DOCUMENTS

| | | | | |
|---|---|---|---|---|
| EP | 0779618 | 6/1997 | | G11B/17/04 |
| EP | 1017056 | 7/2000 | | G11B/23/033 |
| JP | 8167215 | 3/1992 | | G11B/17/04 |
| JP | 2000036147 | 9/2000 | | G11B/15/675 |
| WO | WO9845843 | 10/1998 | | G11B/23/033 |

* cited by examiner

Primary Examiner—William Korzuch
Assistant Examiner—Mark Blouin
(74) Attorney, Agent, or Firm—Jay H. Maioli

(57) ABSTRACT

There is obtained a disk cartridge apparatus in which when a plurality of disk cartridges which are different in size and thickness are loaded on a drive device, the heights of respective switch detection surfaces of disk cartridges can be horizontally aligned with a mode detection switch of the drive device.

A disk cartridge apparatus comprises disk cartridges (1) (12) stored within cartridge housings different in size and thickness in which disks having different diameters are stored, mis-erase prevention plugs (44) (49) including mis-erase prevention detection holes (45) (50) having switch detection surfaces (46) (51) on the disk cartridges (1) (12), a cassette compartment (23) including a recording and reproducing portion for loading the disk cartridge (1) (12) to record and/or reproduce the disk, a detection switch (47) (52) disposed on the cassette compartment (23) to detect the mis-erase prevention detection holes (45) (50) and a position reference portion for determining the positions and heights of the disk cartridges on the cassette compartment (23), wherein when the disk cartridge (1) (12) is loaded on the cassette compartment (23), the heights of the respective switch detection surfaces (46) (51) of the disk cartridges can be horizontally aligned with the detection switches (47) (52).

2 Claims, 8 Drawing Sheets

DISK CARTRIDGE APPARATUS

BACKGROUND OF THE INVENTION

1. Field of the Invention

The present invention relates to a disk cartridge apparatus capable of recording an information signal on a signal recording layer or reproducing an information signal from the signal recording layer by irradiating laser beams on the signal recording layer of an optical disk, for example. More specifically, the present invention relates to a disk cartridge apparatus of a so-called compatible type in which a plurality of disk cartridges having cartridge housings different in size and thickness for storing therein disks having different diameters are selectively loaded on a recording and reproducing apparatus and in which while the disk cartridges different in size and thickness are being loaded on the recording and reproducing apparatus, heights of respective switch detection surfaces of disk cartridges different in size are aligned with a detection switch of the recording and reproducing apparatus.

2. Description of the Related Art

Optical disks capable of reproducing information from a recording medium or recording information on the recording medium by optical beams have heretofore been proposed as recording mediums for a variety of information such as audio information or video information. This kind of optical disk can be formed of a single flat plate-like disk and hence it is easy to handle. Moreover, because it has a large recording capacity as compared with other recording medium such as a magnetic tape, it is widely applied as a recording medium for audio information, video information and data processed by a computer.

A demand for more miniaturizing a recording and/or reproducing apparatus using an optical recording medium such as an optical disk is increasing because a space in which the recording and/or reproducing apparatus is assembled into an information processing apparatus such as a computer should be reduced more.

In order to miniaturize the recording and/or reproducing apparatus, the recording medium also should be miniaturized and a demand for a high storage capacity recording medium also is increasing. To this end, there have been proposed a plurality of kinds of disk cartridges having cartridge housings of different size and different thickness to store therein disks having different diameters as recording mediums. The assignee of the present application has previously proposed these disk cartridges as Japanese Patent Application No. 11-176029.

It has been customary that a disk cartridge has mis-erase protection detection hole and a disk discrimination detection hole. These detection holes are generally discriminated by depressing a detection pin of a mode detection switch on a drive apparatus side. However, a tolerance of a height of the detection pin of the mode detection switch falls within approximately (0.1 mm and an accuracy of the detection pin is low as compared with surrounding parts. There is then a large possibility that these detection holes will be discriminated erroneously.

When the above disk cartridges which are different in size and thickness can be loaded onto and driven by a single drive apparatus, if detection heights of mis-erase protection detection holes, for example, of the disk cartridges are different, there is then the risk that the detection holes will be discriminated by the mode detection switch erroneously more frequently. In a floppy disk or a disk cartridge such as an MD (mini disc) and an MO (magneto-optical disk), for example, there is no way to avoid the above risk on the assumption that the disk cartridges of different size and different thickness are driven by a single drive apparatus.

SUMMARY OF THE INVENTION

The present invention is made in order to solve the above problems and is intended to provide a disk cartridge apparatus in which respective switch detection planes of disk cartridges can be made flush with a mode detection switch of a drive apparatus when a plurality of disk cartridges which are different in size and thickness are loaded onto the drive apparatus.

In order to solve the above object, a disk cartridge apparatus according to the present invention is comprised of a plurality of disk cartridges having cartridge housings, each being different in size and thickness, to store therein disks having different diameters, a plurality of detection holes having switch detection surfaces for discriminating modes of the disk cartridges defined on one surface of each of the disk cartridges different in size and thickness and a recording and reproducing device including a recording and reproducing portion for selectively loading thereon the plurality of disk cartridges different in size and thickness and recording and/or reproducing the disks having different diameters, the recording and reproducing device including, detection switches for discriminating modes of the disk cartridges by detecting the plurality of detection holes of said disk cartridges different in size and thickness and a position reference portion for properly deciding on the positions and heights of the disk cartridges different in size and thickness relative to the recording and reproducing device, wherein when said plurality of disk cartridges different in size and thickness are loaded on the recording and reproducing device, the height of the detection switch surface of a disk cartridge having a large diameter and the height of the switch detection surface of a disk having a small diameter are aligned with each other with respect to the detection switch.

According to the above disk cartridge apparatus, even when the respective switch detection surfaces of the disk cartridges different in size and thickness are different in height, the disk cartridges are loaded on the recording and reproducing apparatus and have positions thereof decided on by the position reference portion so that the respective switch detection surfaces of the disk cartridges can be aligned with the detection switch. Thus, it is possible to avoid the detection holes of the disk cartridges different in size and thickness from being discriminated erroneously without changing the heights of the detection switches.

DESCRIPTION OF THE PREFERRED EMBODIMENTS

A disk cartridge apparatus according to an embodiment of the present invention will be described with reference to the drawings, in which case the present invention is applied to two disk cartridges having large and small diameters.

Figure 1:
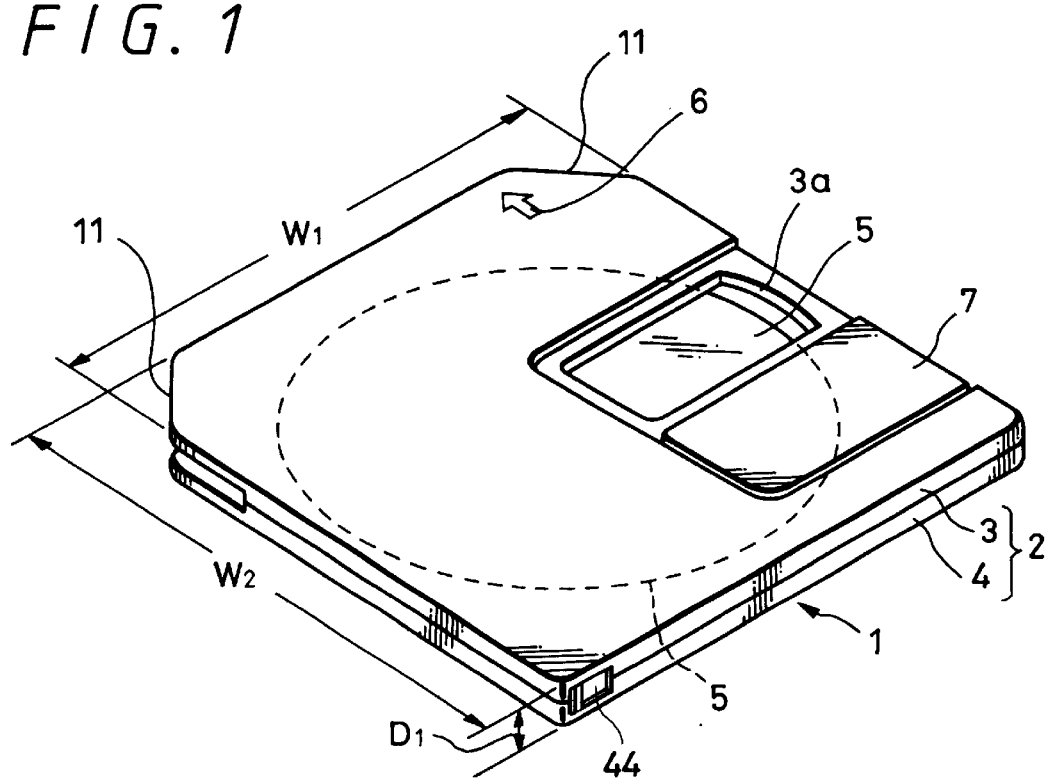
FIG. 1 is a top perspective view illustrating a large disk cartridge according to the present invention.
Figure 2:
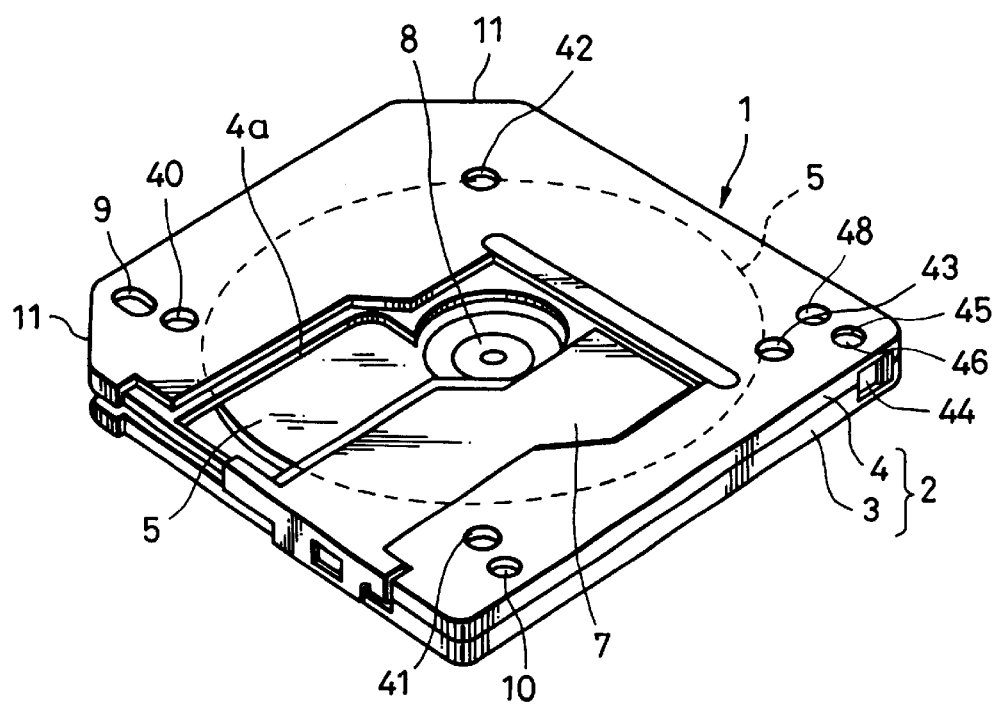
FIG. 2 is a bottom perspective view illustrating the same large disk cartridge.
Figure 3:
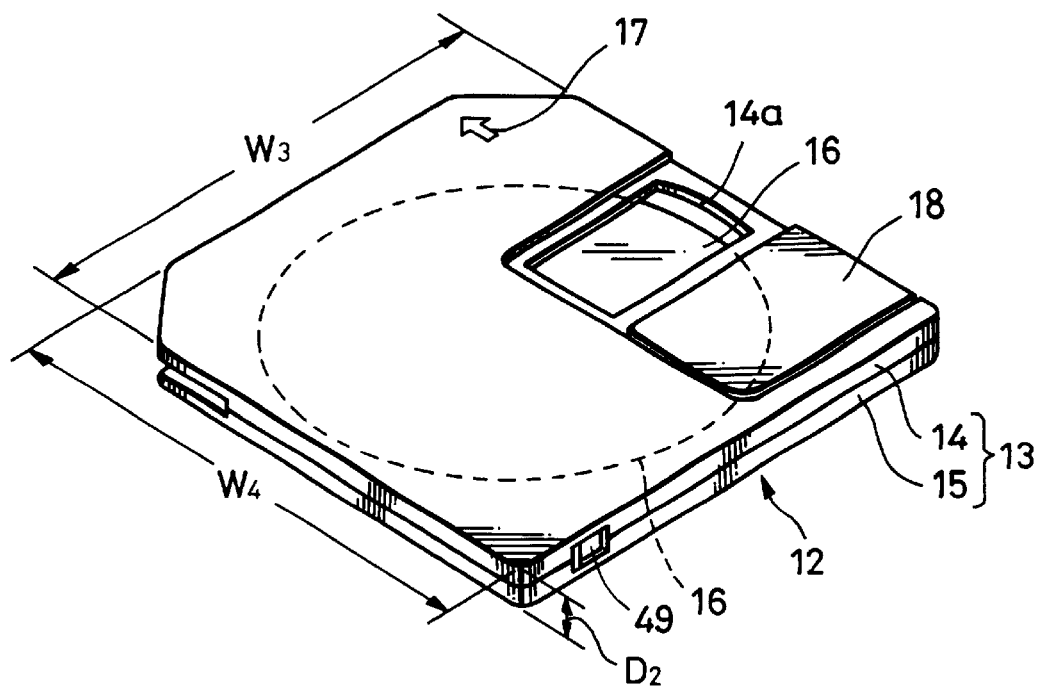
FIG. 3 is a top perspective view illustrating a small disk cartridge according to the present invention.
Figure 4:
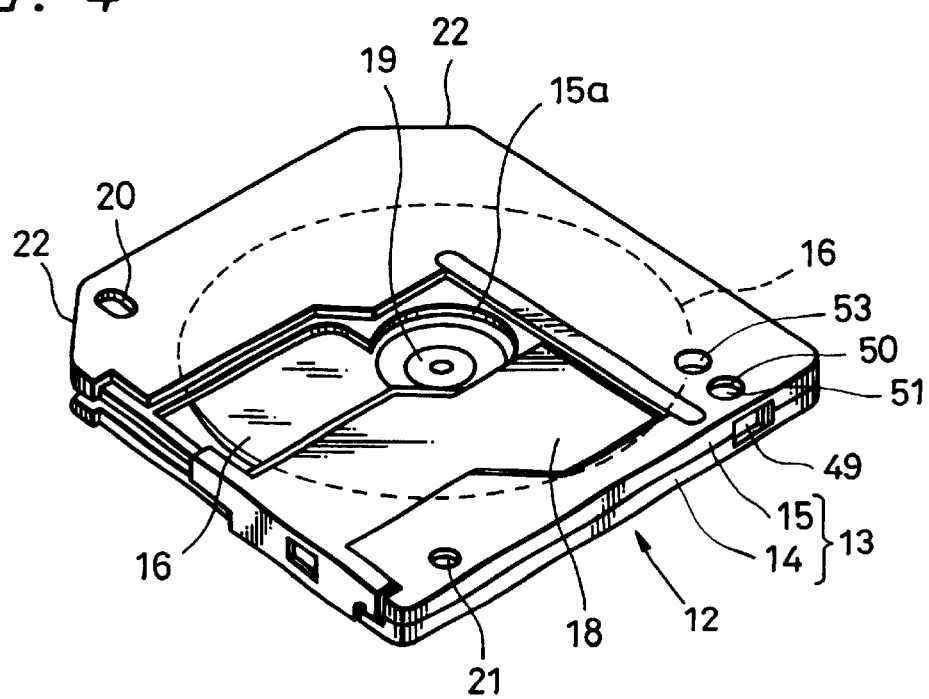
FIG. 4 is a bottom perspective view illustrating the same small disk cartridge according to the present invention.

FIG. 1 is a top perspective view illustrating a disk cartridge storing therein a disk having a large diameter (hereinafter referred to as a "first disk cartridge") with its shutter plate being opened. FIG. 2 is a bottom perspective view illustrating the same disk cartridge with its shutter plate being opened. FIG. 3 is a top perspective view illustrating a disk cartridge storing therein a disk having a small diameter (hereinafter referred to as a "second disk cartridge") with its shutter plate being opened. FIG. 4 is a bottom perspective view illustrating the same disk cartridge with its shutter plate being opened.

A first disk cartridge is generally depicted by reference numeral 1, and a cartridge housing 2 is comprised of an upper half 3 and a lower half 4 which are joined at their joint surfaces by ultrasonic welding. A disk 5 stored within the first disk cartridge 1 is an optical disk, for example, and an outside diameter of a disk is (64.8 mm, by way of example. In this case, the disk housing 2 is standardized in size such that a length W1 of one length perpendicular to the disk cartridge 1 insertion direction (shown by an arrow-like marker 6) is 72 mm, a length W2 of the other side perpendicular to the above side is 68 mm and a thickness D1 is 5 mm.

The above first disk cartridge 1 includes a slide shutter plate 7 that can be slid to open and close both surfaces of the cartridge housing 2. When this shutter plate 7 is opened on the upper surface side of the disk cartridge 1, the disk 5 is partly exposed at its upper surface along the diameter from an opening window 3a defined on the upper half 3. When the shutter plate is opened on the lower surface side of the disk cartridge 1, the disk 5 is partly exposed at its lower surface (read/write surface) along the diameter from an opening window 4a of the lower half 4. When the shutter plate 7 is opened on the lower surface side of the disk cartridge 1, a chucking plate 8 of the disk 5 is exposed.

The lower half 4 of the first disk cartridge 1 has an oblong location hole 9 defined the top of the insertion side and a circular location hole 10 defined at the rear of the insertion side in the opposite direction of the location hole 9. The two corners of the top of the insertions side of the first disk cartridge 1 are diagonally cut so as to shape relatively large recessed surfaces 11,11.

The second disk cartridge is generally depicted by reference numeral 12. In this case, a cassette housing 12 is comprised of an upper half 14 and a lower half 15 which are joined at their joint surfaces by ultrasonic welding. A disk 16 stored within the second disk cartridge 12 is an optical disk, for example, and its disk outside diameter is (50 mm, by way of example. In this case, the disk housing 13 is standardized such that a length W3 of one side perpendicular to the disk cartridge 1 insertion direction (shown by an arrow-like marker 17) is 58 mm, a length W4 of the other side perpendicular to this side is 53 mm and a thickness D2 is 4 mm.

The above second disk cartridge 12 includes a shutter plate 18 that can be slid to open and close both surfaces of the cartridge housing 13. When this shutter plate 18 is opened on the upper surface side of the disk cartridge 12, the disk 16 is partly exposed at its upper surface along the diametrical direction from an opening window 14a defined on the upper half 14. When the shutter plate 18 is opened on the lower surface side of the disk cartridge 12, the disk 16 is partly exposed at its lower surface (recording layer) along the diametrical direction from an opening window 15a defined on the lower half 15. When the shutter plate 18 is opened on the lower surface side of the disk cartridge 12, a chucking plate 19 of the disk 16 is exposed.

The lower half 15 of the second disk cartridge 12 has an oblong location hole 20 defined at the top of the insertion side and a circular location hole 21 defined at the rear of the insertion side in the opposite direction of the location hole 20. The two corners of the top of the insertions side of the first disk cartridge 12 are diagonally cut so as to shape relatively large recessed surfaces 22, 22.

Figure 5:
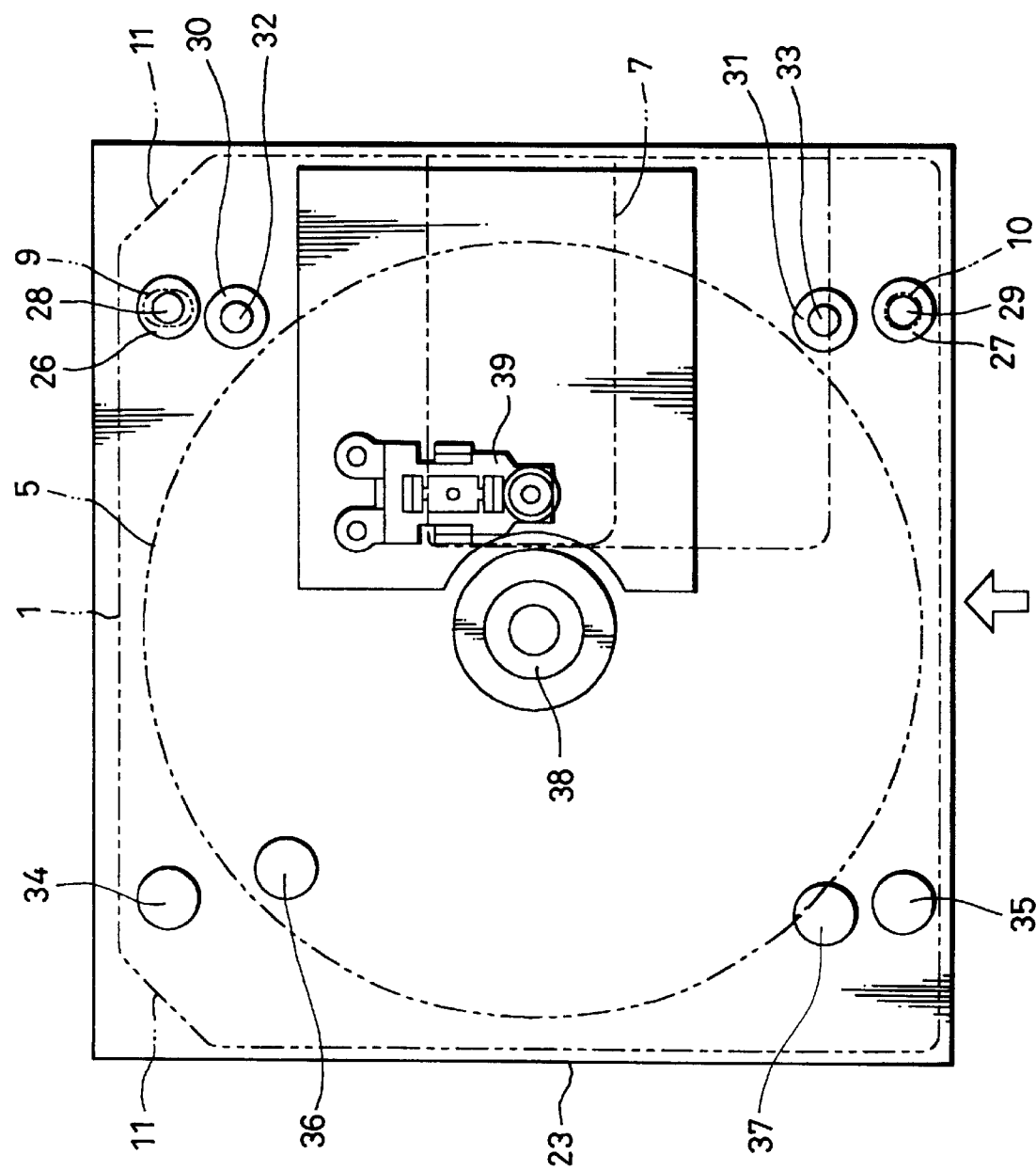
FIG. 5 is a plan view illustrating the state in which the large disk cartridge is loaded onto a cassette compartment.
Figure 6:
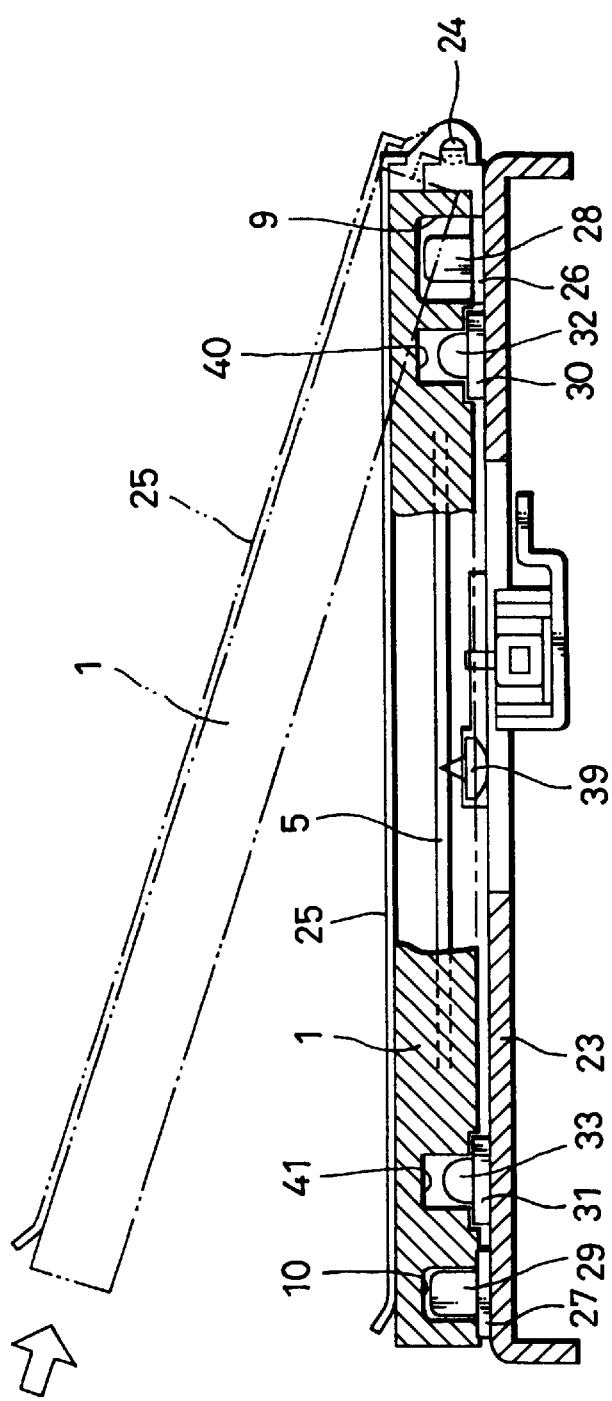
FIG. 6 is a cross-sectional view illustrating the same state in which the large disk cartridge is loaded onto the cassette compartment.

FIG. 5 is a plan view of a chassis 23 of a cassette compartment (hereinafter referred to as a "cassette compartment") of a recording and reproducing apparatus onto which are loaded the above disk cartridges. A phantom line shows the state in which the first disk cartridge 1 is loaded onto the chassis 23. FIG. 6 is a cross-sectional view illustrating the state in which the first disk cartridge 1 has properly been positioned on the chassis 23.

The first disk cartridge 1 is inserted into a holder 25 which can swing about a hinge portion 24 in an pop-up fashion (pop-up fashion) from the direction shown by an arrow. Then, when the holder 25 is swung in the chassis 23 side, the first disk cartridge is brought to the loading position.

The chassis 23 has at its one side (right-hand side) opposite to the hinge portion 24 side formed a pair of protrusions which are used to determine the height of the first disk cartridge 1. On the two protrusions 26, 27 are projectingly formed positioning pins 28, 29 with which the location holes 9, 10 of the first disk cartridge 1 are engaged respectively.

The chassis 23 has a pair of protrusions 30, 31 formed adjacent to the insides of these positioning pins 28, 29 to determine the height of the second disk cartridge 12. On the two protrusions 30, 31 are prjectingly formed positioning pins 32, 33 with which the location holes 20, 21 of the second disk cartridge 12 are engaged.

The chassis 23 has a pair of protrusions 34, 35 of the same height as that of the protrusions 26, 27 for determining the height of the first disk cartridge 1 at positions symmetrical to those of the pair of protrusions 26, 27 of the first disk cartridge 1. The chassis 23 has protrusions 36, 37 of the same height as that of the protrusions 30, 31 for determining the height of the second disk cartridge 12 at positions adjacent to the insides of the two protrusions 34, 35. The protrusions 30, 31 and 36, 37 which are used to determine the height of the second disk cartridge 12 are slightly higher than the protrusions 26, 27 and 34, 35 which are used to determine the height of the first disk cartridge 1.

On the above chassis 23, there are disposed a turntable 38 for chucking and rotating to drive the disk 5 and an optical pickup device 39 for reproducing recorded information from the disk 5 or recording record information on the disk.

When the pair of location holes 9, 10 are engaged with the pair of positioning pins 28, 29 of the chassis 23, the first disk cartridge 1 loaded on the above chassis 23 can be positioned properly. Simultaneously, the height of the lower surface of the first disk cartridge 1 is properly determined by the respective protrusions 26, 27, 34, 35, whereby the first disk cartridge 1 can be held in a horizontal state.

According to the present invention, the first disk cartridge 1 has stepped relief holes 40, 41 so that the first disk cartridge may not interfere with the pair of positioning pins 32, 33 and the protrusions 30, 31 of the second disk cartridge 12. The first disk cartridge has relief holes 42, 43 (see FIG. 2) so that the first disk cartridge may escape from the protrusions 36, 37 of the second disk cartridge 12. As a consequence, in the state in which the disk cartridge 1 is loaded onto the chassis, the height of the first disk cartridge can properly be determined and the first disk cartridge can properly be positioned without being bothered by the positioning pins 32, 33 and the protrusions 30, 31, 36, 37 of the second disk cartridge 12.

Figure 7:
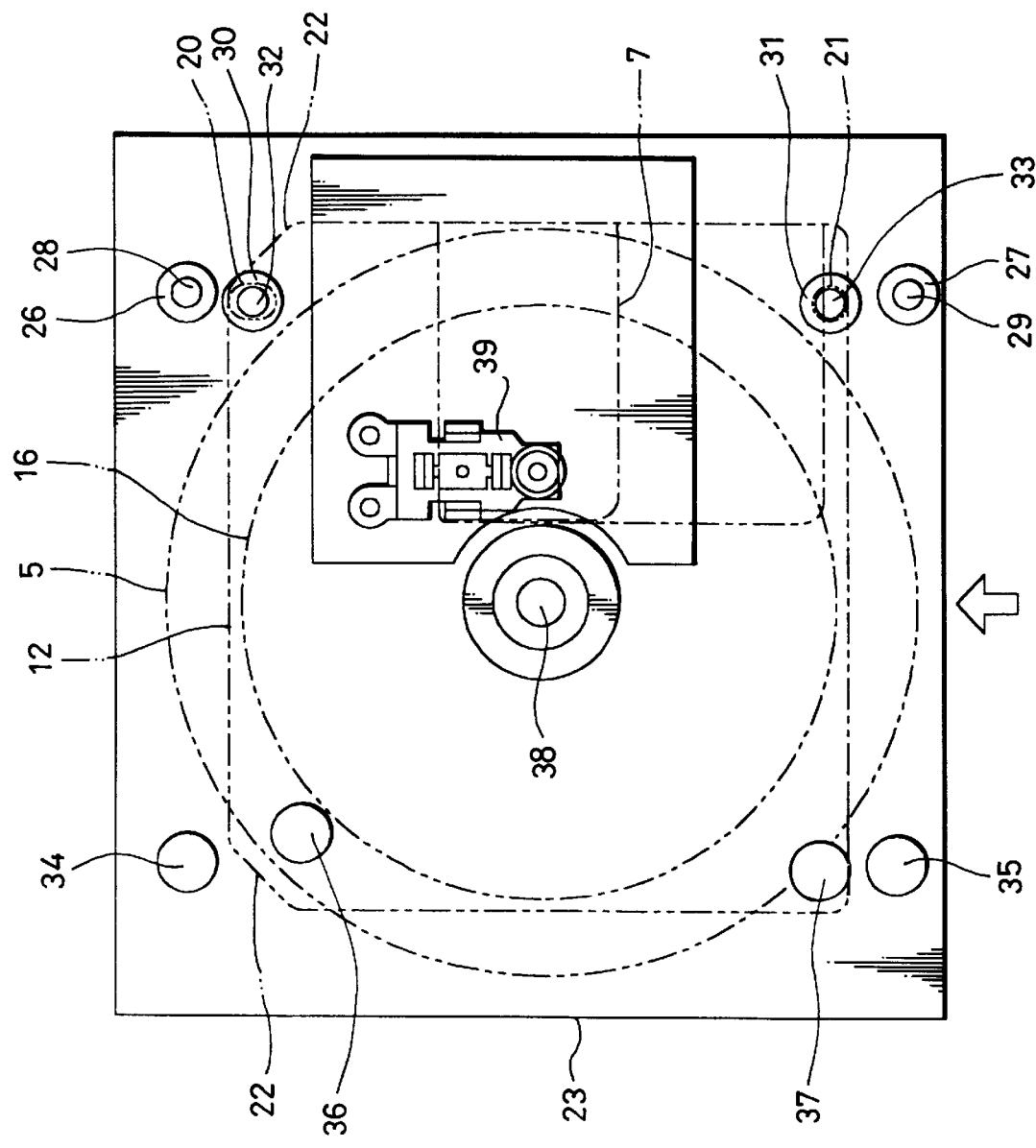
FIG. 7 is a plan view illustrating the state in which a small disk cartridge is loaded onto a small cassette compartment.
Figure 8:
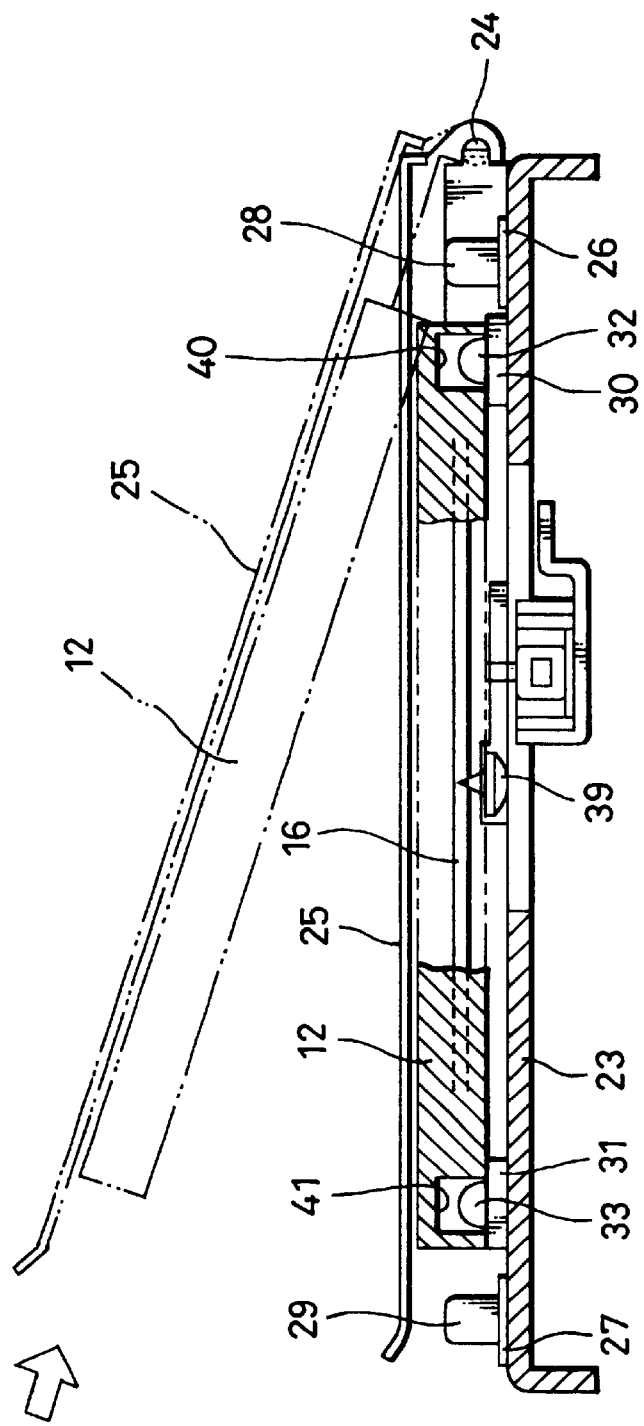
FIG. 8 is a cross-sectional view illustrating the same state in which the small disk cartridge is loaded onto the small cassette compartment.

A phantom line in FIG. 7 illustrates the state in which the second disk cartridge 12 is loaded onto the chassis 23. FIG. 8 is a cross-sectional view showing the state in which the second disk cartridge 12 is properly positioned on the chassis 23.

When the pair of location holes 20, 21 are engaged with the pair of positioning pins 32, 33 of the chassis 23, the second disk cartridge 12 loaded on the chassis 23 can be positioned properly. Simultaneously, the height of the lower surface of the second disk cartridge 12 is properly determined by the respective protrusions 30, 31, 36, 37, whereby the second disk cartridge 12 can be held in a horizontal state.

In the state in which the second disk cartridge 12 is loaded onto the chassis 23, since the positioning pins 28, 29 and the protrusions 34, 35 of the first disk cartridge 1 are located at the positions at which they may not interfere with the second disk cartridge 12, the first disk cartridge does not need any special relief holes. If the positioning pins 32, 33 of the second disk cartridge 12 are located outside the outside diameter of the disk 5 so as not to interfere with the disk 5 when the first disk cartridge 1 is loaded on the chassis 23, then the second disk cartridge can be loaded on the chassis without bothering the first disk cartridge 1.

The reason why the protrusion for determining the height of the second disk cartridge 12 are higher than the protrusions for determining the height of the first disk cartridge 1 is that a difference between the thickness (5 mm) of the housing 2 of the first disk cartridge 1 and the thickness (4 mm) of the housing 13 of the second disk cartridge 12 is adjusted by the heights of the protrusions such that the recording layers of the disks 5 and 16 can be accurately irradiated with spots of laser beams from the optical pickup device 39.

Figure 9:
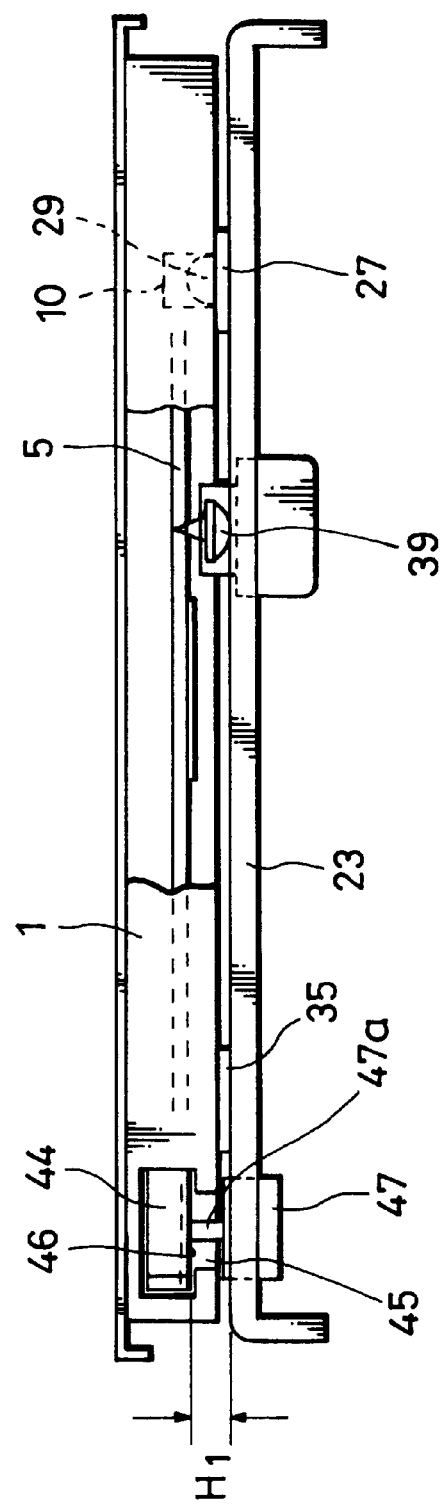
FIG. 9 is a side view to which reference will be made in explaining mis-erase prevention detection operation effected when a large disk cartridge is loaded onto a cassette compartment.

The first disk cartridge 1 has on one side of its back provided a mis-erase protection plug 44 for protecting recorded information from being erased from the disk 5 by mistake. The mis-erase protection plug 44 can be slid from the outside of the cartridge housing 2. When this mis-erase protection plug 44 is slid, a mis-erase protection detection hole 45 defined on the lower half 4 can be closed or opened by a switch detection surface 46 which forms a part of the plug 44. The position of the mis-erase protection plug 44 can be discriminated by detecting whether or not a detection pin 47a of a first detection switch 47 disposed on the chassis 23 is depressed by this switch detection surface 46 as shown in FIG. 9. A discrimination hole 48 for discriminating the specifications of the first disk cartridge 1 is provided adjacent to the above mis-erase protection detection hole 45.

Figure 10:
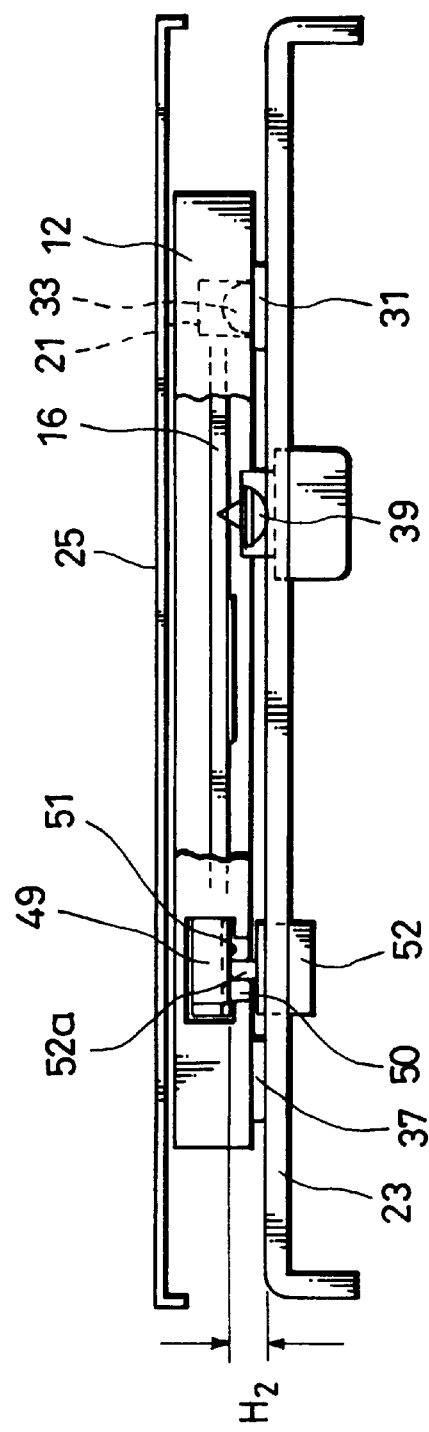
FIG. 10 is a side view to which reference will be made in explaining mis-erase prevention detection operation effected when a small disk cartridge is loaded onto a cassette compartment.

The second disk cartridge 12 has at its position near one side of the back provided a mis-erase protection plug 49 for protecting recorded information from being erased from the disk 16 by mistake. The mis-erase protection plug 49 can be slid from the outside of the cartridge housing 13. When this mis-erase protection plug 49 is slid, a mis-erase protection detection hole 50 defined on the lower half 15 can be closed or opened by a switch detection surface 51 which forms a part of the plug 49. The position of the mis-erase protection plug 49 can be discriminated by detecting whether or not a detection pin 52a of a second detection switch 52 disposed on the chassis 23 is pressed by this switch detection surface 51 as shown in FIG. 10. A media sensor hole 53 for sensing a media type of the second disk cartridge 12 is provided adjacent to the above mis-erase protection detection hole 50.

In the mis-erase protecting plugs 44, 49 of the first and second disk cartridges 1, 12, the height levels of the respective switch detection surfaces 46, 51 are different depending on the thickness of the disk cartridge and the thickness of the cartridge shell. However, while the heights from the chassis 23 of the disk cartridges 1, 12 are respectively set, a height H1 from the chassis 23 of the first disk cartridge 1 to the switch detection surface 46 and a height H2 from the chassis 23 of the second disk cartridge 12 to the switch detection surface 46 are set to be identical to each other.

Diameters of and distances between the mis-erase preventing detection holes 45, 50, of the mis-erase preventing plugs 44, 49 of the first and second disk cartridges 1, 12 and the discrimination holes 48, 53 are made identical to each other.

As described above, the disk cartridge apparatus according to the present invention has a merit that two kinds of disk cartridges different in size and thickness can selectively loaded thereon and recorded or reproduced. In particular, when the heights from the chassis 23 of disk cartridges 1, 12 are set, respectively, the height H1 from the chassis 23 of the first disk cartridge 1 to the switch detection surface 46 and the height H2 from the chassis 23 of the second disk cartridge 12 to the switch detection surface 46 can be made identical to each other. In addition, the diameters of and the distances between the mis-erase preventing detection holes 45, 50 of the mis-erase preventing plugs 44, 49 and the discrimination holes 48, 53 can be made identical to each other. Thus, the same first and second detection switches 47, 53 of the mis-erase preventing plugs 44, 49 of the first and second disk cartridges 1, 12 can be used and can be mounted on the chassis 23 at the same height. As a result, the mis-erase preventing holes 45, 50 of the disk cartridges 1, 12 different in size and thickness can be prevented from being discriminated erroneously and the degree of freedom required when a mechanism is designed can be increased. Therefore, the disk cartridge apparatus can include a highly-reliable mis-erase preventing mechanism.

When the use of detection switches 47, 52 of the first and second disk cartridges 1, 12 are shared, these detection switches can be used in common by sliding one detection switch relative to the respective switch detection holes 45, 50 of the disk cartridges 1, 12.

While the mis-erase preventing plugs 44, 49 and their detection switches 47, 52 have been described so far, the present invention is not limited thereto and there is obtained the disk cartridge apparatus in which detection switches for detecting the discrimination holes 48, 53 also can be prevented from being discriminated erroneously.

Since the first disk cartridge 1 has the relief hole so as to interfere with the positioning pins 32, 33 of the second disk cartridge 12 when the first disk cartridge 1 is loaded and the positioning pins 32, 33 of the second disk cartridge 12 are located outside the outer diameter of the disk 3 so as not to interfere with the disk 5 when the first disk cartridge 1 is loaded on the chassis 23, there can be obtained a highly-reliable disk cartridge apparatus on which two kinds of disk cartridges different in size can be loaded.

Since the two disk cartridges 1, 12 have the recessed surfaces 11, 22 formed at the two corner portions in the insertion side, a user can easily recognize the insertion direction of the disk cartridge and hence the disk cartridge can be prevented from being inserted in the wrong direction. Even when a user inserts the disk cartridge into the holder 25 in the slanting direction, the recessed surfaces 11, 22 can function as guide surfaces to correct the insertion direction of the disk cartridge so that the disk cartridge can be inserted into the holder 25.

When the large first disk cartridge 1 is inserted into the disk cartridge holder 25, since the left and right side walls of the cartridge are guided by the holder 25, the large first disk cartridge can be inserted into an accurate position without providing a special guide mechanism. On the other hand, in the case of the small second disk cartridge 12, the holder 25 should be provided with a guide mechanism. In this case, the guide mechanism can easily be realized by a mechanism which allows the second disk cartridge to be evacuated from the large first disk cartridge when the large first disk cartridge 1 is inserted into the holder 25.

The present invention is not limited to the above embodiments which have been illustrated in the sheets of drawings and can be variously modified without departing from the gist thereof.

While the pair of the positioning pins are located along the insertion direction of the disk cartridge as described above, the present invention is not limited thereto and the pair of the positioning pins can be located at the left and right of the rear end of the disk cartridge with similar action and effects being achieved. In this case, the pair of the positioning pins may be circular in shape.

While the present invention is applied to the two kinds of disk cartridges different in size as described above, the present invention is not limited thereto and can be applied to more than two kinds of disk cartridges different in size by forming relief holes of positioning pins at the positions at which cartridges interfere with the positioning pins or by locating positioning pins at the positions at which the positioning pins can be evacuated from the disk.

As described above, according to the disk cartridge apparatus of the present invention, when a plurality of disk cartridges different in size and thickness are loaded on the recording and reproducing apparatus, since the height of the switch detection surface of the disk cartridge having the large diameter and the height of the switch detection surface of the disk cartridge having the small diameter are made identical to each other relative to the detection switch, the detection holes of the disk cartridges different in size and thickness can be prevented from being discriminated erroneously, and the degree of freedom required when the mechanism is designed can be increased. Hence, the disk cartridge apparatus can be made highly-reliable.

Since the heights of the disks are made identical to each other on the recording and reproducing portion when a plurality of disk cartridges different in size and thickness are loaded on the recording and reproducing apparatus, the disk cartridges different in size and thickness can be recorded and reproduced without moving the recording and reproducing section relative to the disk cartridges from a mechanical standpoint.

Since the diameters and the intervals of a plurality of detection holes of the disk cartridge different in size and thickness are made identical to each other, it becomes possible to use the same detection switch. In addition, since the detection switch is equipped with a movement mechanism, one detection switch can be made common to a plurality of disk cartridges.

Further, since the mis-erase protection detection hole whose switch detection surface can be slid to open and close and the disk discrimination detection hole are applied to the detection holes, there can be obtained highly-reliable disk cartridge mis-erase protection detection function and discrimination detection function.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disk recording/reproducing apparatus for selectively installing therein a first disk cartridge having a first detection hole and being of a first thickness and a second disk cartridge smaller than said first disk cartridge, being of a second thickness less than the first thickness, and having a second detection hole, where a mis-erase protecting plug is slidably positioned between an upper shell and a lower shell of the first disk cartridge and the second disk cartridge, respectively, and opens and closes a mis-erase preventing detection hole of each of the first disk cartridge and the second disk cartridge, where a respective portion of the mis-erase protecting plug disposed through the mis-erase preventing detection hole of each of the first disk cartridge and the second disk cartridge is used as the detection surface for the mis-erase preventing detection hole, the apparatus comprising:

a turntable;

an optical pickup;

a first positioning pin having a first height-positioning base, the first positioning pin being for engagement with a positioning aperture provided on said first cartridge for positioning said first disk cartridge; and a second positioning pin having a second height-positioning base, the second positioning pin being for engagement with a second positioning aperture provided on said second cartridge for positioning said second disk cartridge; and a common detection switch for detecting said first detection hole and said second detection hole, wherein
a height of said first detection hole when said first disk cartridge is installed and a height of said second detection hole when said second disk cartridge is installed are the same, wherein
said second positioning pin is located at a position outside of a periphery of a disk included in said first disk cartridge.

2. A disk recording/reproducing apparatus for selectively installing therein a first disk cartridge having a first detection hole and being of a first thickness and a second disk cartridge smaller than said first disk cartridge, being of a second thickness less than the first thickness, and having a second detection hole, where a mis-erase protecting plug is slidably positioned between an upper shell and a lower shell of the first disk cartridge and the second disk cartridge, respectively, and opens and closes a mis-erase preventing detection hole of each of the first disk cartridge and the second disk cartridge, where a respective portion of the mis-erase protecting plug disposed through the mis-erase preventing detection hole of each of the first disk cartridge and the second disk cartridge is used as the detection surface for the mis-erase preventing detection hole, the apparatus comprising:

a turntable;

an optical pickup;

a first positioning pin having a first height-positioning base, the first positioning pin being for engagement with a positioning aperture provided on said first cartridge for positioning said first disk cartridge; and a second positioning pin having a second height-positioning base, the second positioning pin being for engagement with a second positioning aperture provided on said second cartridge for positioning said second disk cartridge; and a common detection switch for detecting said first detection hole and said second detection hole, wherein a height of said first detection hole when said first disk cartridge is installed and a height of said second detection hole when said second disk cartridge is installed are the same, wherein said second positioning pin is located at a position outside of a periphery of a disk included in said first disk cartridge and inside said first positioning pin.

* * * * *